Figure 1:
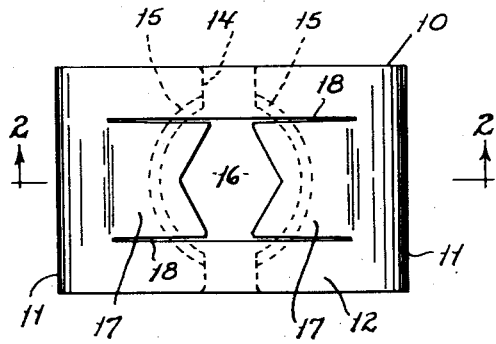

Dec. 7, 1943.   G. A. TINNERMAN   2,336,319
FASTENING DEVICE
Original Filed May 9, 1942

INVENTOR.
George A. Tinnerman
BY Bates, Teare & McBean
Attorneys.

Patented Dec. 7, 1943

2,336,319

UNITED STATES PATENT OFFICE 2,336,319

FASTENING DEVICE

George A. Tinnerman, Cleveland, Ohio, assignor to Tinnerman Products, Inc., Cleveland, Ohio, a corporation of Ohio Original application May 9, 1942, Serial No. 442,335. Divided and this application February 17, 1943, Serial No. 476,219

5 Claims. (Cl. 85—36)

This application is a division of my pending application, Serial No. 442,335, filed May 9, 1942, for a fastening device, and relates to such device formed to embrace an arm or other member having a bolt opening and hold itself in place thereon, the device being provided with an opening adapted to register with the opening in the embraced member and having thread-engaging means to coact with a bolt passing through the registering openings. A particular object of the present invention is to provide means formed integrally with the fastening device for automatically holding it in place on the embraced member.

More specifically, the fastener of the present invention comprises a clip made of a strip of sheet material deformed in an intermediate region about an opening through it to provide thread-engaging means, two end portions of the strip being doubled toward each other into position more or less parallel with the intermediate region and each formed with means to engage the member embraced to hold the fastener effectively in place on such member.

My fastener is illustrated in the drawing hereof and is hereinafter more fully described and its essential novel characteristics are set out in the claims.

Figure 2:
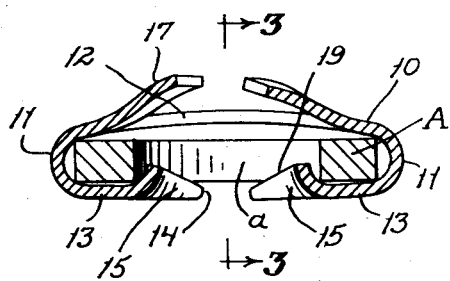
Figure 3:
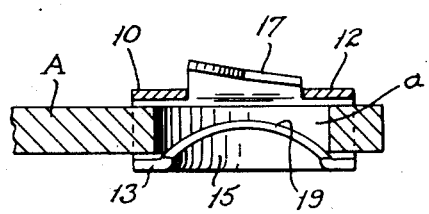
Figure 4:
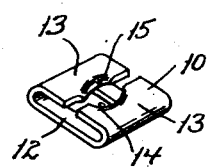
Figure 5:
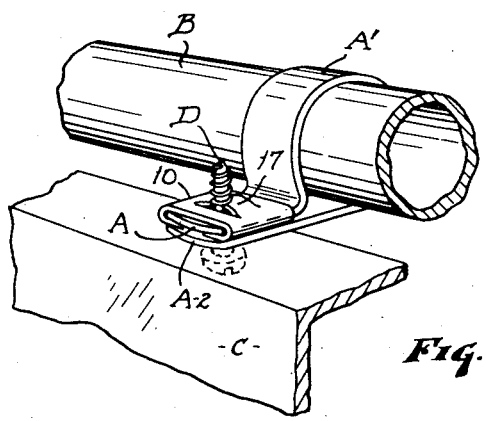

In the drawing, Fig. 1 is a plan of my fastening device; Fig. 2 is a longitudinal section thereof taken on the plane indicated by the line 2—2 in Fig. 1 and showing the device mounted on an embraced arm; Fig. 3 is a transverse section of the fastener and embraced arm in the plane indicated by the line 3—3 in Fig. 2; Fig. 4 is a perspective of the fastener itself, looking at the face which is the bottom in Figs. 2 and 3; Fig. 5 is a perspective showing the fastener mounted on a conduit clamp and support.

The fastener designated 10 as a whole is made of a single strip of sheet material doubled on itself in two intermediate regions designated 11 to provide what may be called an upper intermediate portion 12 and two under portions 13 aligned with each other but separated as at 14 to provide for the passage of the bolt. These under portions are provided with upwardly extending lugs 15 which form the locking means when the fastener is mounted, as hereinafter explained.

The intermediate or top portion 12 has an opening 16 for the passage of the bolt and is deformed about the opening to provide thread-engaging means. In the form shown this deformation comprises the provision of two inclined tongues 17 on opposite sides of the opening. These tongues are made by forming the opening 16 of approximately diamond shape and cutting two parallel longitudinal slits 18 crossing and forming the boundaries for said opening. Then the tongues are bent upwardly and warped in opposite directions indicated in Figs. 2 and 3 to bound a helical turn and thus provide the thread-engaging means.

The present invention is concerned particularly with the means on the two under portions 13 of the fastener for holding it in place. As shown the means comprises the lugs 15 made by bending upwardly the extreme ends of these under portions. These upward bends which are shown in the drawing as made at the extreme end of the under portions coact with the member embraced to retain the fastener in position thereon. In the form shown the lugs 15 enter the opening of such member, which is large enough to receive them. This is clearly illustrated in Figs. 2 and 3, where A indicates the arm embraced having an opening $a$ which the projections enter.

The projections 15 are inclined or curved at their extreme or top edges 19 to form a camming surface by means of which the fastener may be readily mounted. That is to say, when the fastener is shoved edgewise across the arm A, the inclined edges 19 first engage the under face of the arm and then as the shoving action continues are cammed downwardly until they come in position to register with the arm opening $a$ whereupon if the opening is large enough they spring into such opening and come into the position shown in Fig. 2.

It will be noted from an inspection of Fig. 4 that the ends of the under portions 13, which are straight across in their extreme edges, are bowed or concaved so that the two opposed edges in their central region more or less nearly form a circular edge defining the bolt opening. This same concaving of the extreme end of the under portion causes the part which is turned upwardly to have the arcuate top shown in Fig. 3, which provides the desired camming surface, enabling the ready mounting of the fastener. It also produces the equivalent of a bolt receiving notch leading from the end.

It will be seen that it is a very simple matter to mount my fastener on the supporting arm and it may be readily shoved into place without requiring any special tools. When in place the engagement with the arm automatically locks the fastener in position. When in such position the opening 14 between the bottom portions, and the opening 16 in the top portion of the fastener register centrally with the opening c of the arm, so that a bolt may be readily passed through these openings and receive its nut by means of the tongues 17.

As an illustration of one use of my fastener, Fig. 5 indicates the fastener mounted on the arm A of a conduit clamp A' which is shown as embracing a conduit B and having another arm A—2 adapted to lie beneath the positioned fastener. In this figure, C designates any suitable support and D a bolt passing through the support through the arms of the clamp and engaging the tongues of the fastener.

It will be seen that the fastener is an extremely simple construction and may be readily manufactured and is adapted for immediate mounting on a supporting arm, automatically locking itself thereto.

I claim:

1. A fastener comprising a single strip of sheet material having a bolt opening in the intermediate region and a pair of opposed tongues cut from the body of the fastener and deflected therefrom and notched and warped at their edges to define a helical thread, the two end portions of the fastener being doubled under the intermediate region and spaced therefrom to enable the passage of a member into the space between the end portions and the intermediate region, the two end portions being separated from each other to provide a bolt opening registering with that between the tongues and the two end portions being deflected at their extreme edges toward the intermediate region to effect a binding engagement against said embraced member.

2. A fastener comprising a single strip of sheet material having a bolt opening in the intermediate region and having thread-engaging means about the opening, the two end portions of the fastener being doubled under the intermediate region and spaced therefrom to enable the passage of an arm into the space between the end portions and the intermediate region, the two end portions being separated from each other to provide a bolt opening registering with that of the intermediate portion, said two end portions being deflected at their extreme ends toward the intermediate region to effect a binding engagement against an embraced member, the top of such deflected end being inclined or curved downwardly toward the general plane of the under portions to provide a camming surface enabling the ready mounting of the fastener by shoving action.

3. A fastener of the character described comprising a strip of sheet metal provided with an opening in its intermediate region for the passage of a bolt, the metal about the opening being deformed to provide a helical turn to engage the thread of the bolt, the two end portions of the fastener being doubled under so that an arm may be embraced on opposite sides by the intermediate region and the end portions, the two end portions having their extreme ends concaved to bound a bolt opening, and bent toward the intermediate region to provide a camming surface to engage the embraced arm and allow the fastener to be slid into place thereon.

4. A fastener of the character described comprising a strip of sheet metal provided with an opening in its intermediate region for the passage of a bolt, the metal about the opening being deformed to provide a helical turn to engage the thread of the bolt, the two end portions of the fastener being doubled under so that a suitable member may be embraced on opposite sides by the intermediate region and the end portions, each of the two end portions having its intermediate part adjacent its extreme end diverted in the direction toward the intermediate region to engage the embraced member and the side margins of each doubled-under portions continuing in the plane of such portion to the end thereof.

5. A fastener of the character described comprising a strip of sheet metal provided with an opening in its intermediate region for the passage of a bolt, the metal about the opening being deformed to provide a helical turn to engage the thread of the bolt, the two end portions of the fastener being doubled under so that a suitable member may be embraced on opposite sides by the intermediate region and the end portions, the two end portions terminating close to each other but each being recessed by a notch leading from the end to provide a space for the passage of the bolt.

GEORGE A. TINNERMAN.